Inventors
P. H. Mitchell
Scott Malcolm

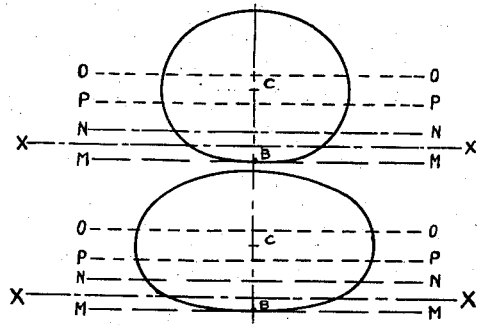
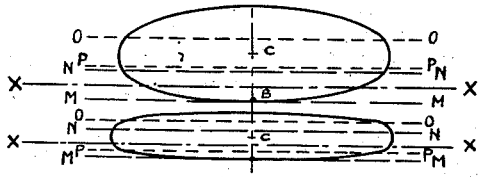
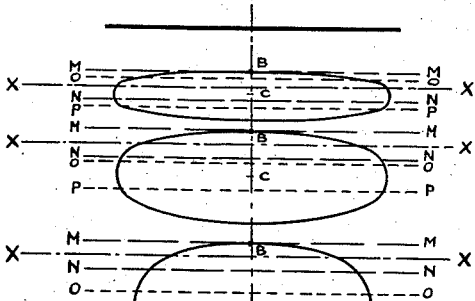
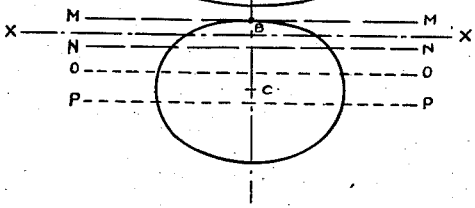
Fig. 2.
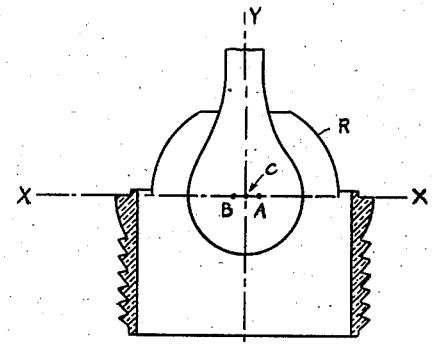
Fig. 4.
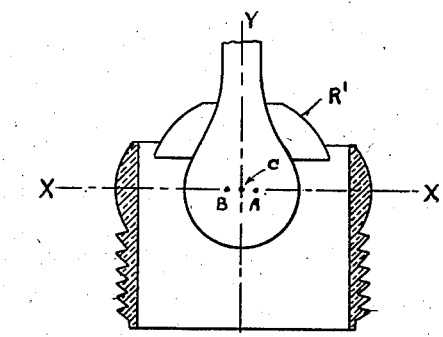
Fig. 5.
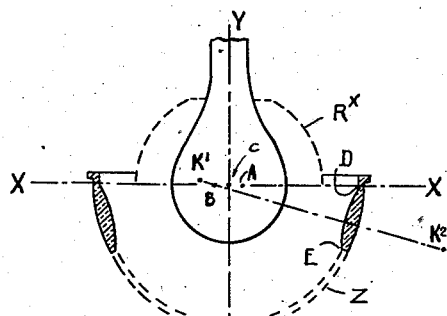
Fig. 6.

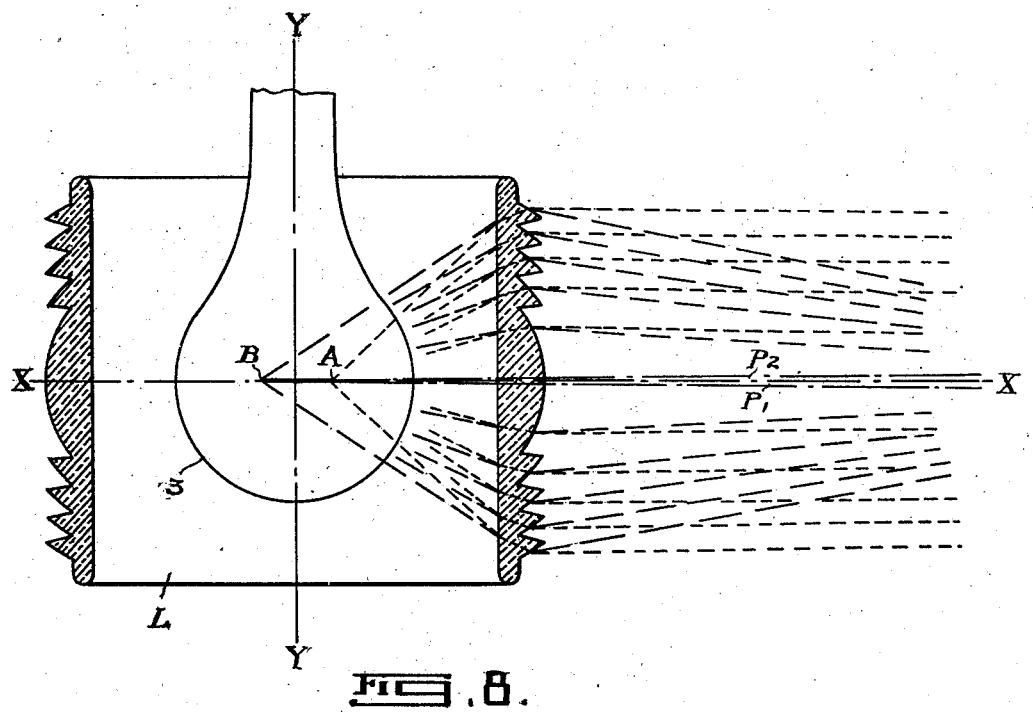

Patented Nov. 23, 1948

2,454,332

UNITED STATES PATENT OFFICE 2,454,332

LENS FOR LIGHTING EQUIPMENT

Percival H. Mitchell and Scott Malcolm,
Toronto, Ontario, Canada

Application February 9, 1944, Serial No. 521,736

6 Claims. (Cl. 240—106.1)

This invention relates to improvements in light-projecting lenses, particularly of the "Fresnel" type in which the light source is arranged axially within a cylindrical light-refracting body and the rays from said source are projected laterally in concentrated zones, and the principal object of the invention is to ensure the maximum concentration of light rays projected from a light source of the flat circular incandescent type in zones extending laterally substantially parallel with one or more principal planes radial to the lighting unit, thereby extending the scope of use of lenses of this type.

The principal feature of the invention consists in the novel construction and arrangement of annular light refracting lens elements above and/or below the focal plane of a cylindrical or "Fresnel" type of lens, whereby the light emanating from various points in the circumference of an incandescent flat circular light source and directed in vertically diverging rings of rays, is refracted laterally into planes having definite angular relation to the focal plane.

In the accompanying drawings Figure 1 is a vertical mid-sectional view of a lamp with a ring type light source and a surrounding annular refracting member formed with a plurality of annular light refracting lens elements.

Figure 3 is a vertical mid-sectional view of a lamp with a ring type light source and a surrounding annular refracting member of a modified form for directing light in horizontal and downward zones.

Figure 4 is a small vertical mid-sectional view of an annular lens similar to the lower half of the lens illustrated in Figure 3 in combination with a reflector enclosing the light source.

Figure 5 is a small vertical mid-sectional view of an annular lens similar to the lower half of Figure 3 but including all of the central lens zone and having a reflector enclosing a portion of the upper half of the light.

Figure 6 is a small vertical mid-sectional view of a further modified form of lighting unit.

Figure 8 is a view similar to Figure 1 but showing the lens elements as having their common focus at A instead of B to produce light rays from A and B converging towards the focal plane, the rays from B diverging inwardly from the rays from A.

Figure 1:
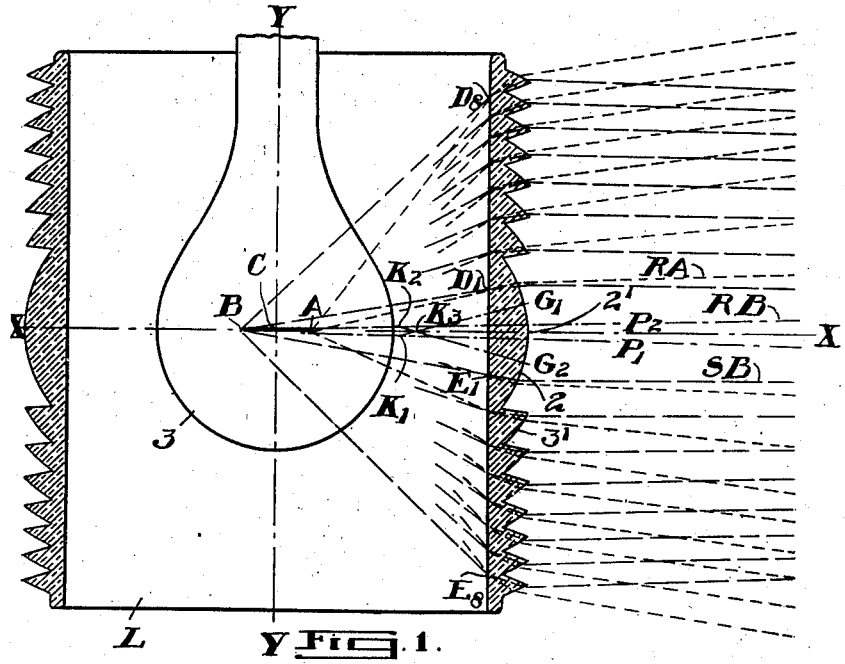

Annular lenses of the "Fresnel" type have been used in many fields of illumination with gas flame and mantle light sources, also with concentrated filament incandescent lamps.

The standard form of such lenses has a single focal point on the axis at the point of intersection of the central focal plane and when such a lens is used with an ideal point light source at the focal point it will refract light from the source incident on the inner face of the cylinder to be emitted outward in planes parallel with the focal plane. When a light source of practical dimensions is used the portion of the light source actually or virtually at the focal point will be refracted as if from an ideal point source, and light from the source in zones surrounding the focal point will be refracted in paths diverging from the path of light refracted from points actually or virtually at the focal point.

The standard incandescent lamp at present in general use in sizes up to 200 watts has its filament in the form of a flat ring, and when this is mounted symmetrically about the focal point of a basic "Fresnel" lens no portion of the filament is actually at the focal point. In fact no part of the filament is closer than one-half inch to the focal point when a 200-watt lamp is used.

Any point of the circumference of the filament when viewed from a point on the focal plane at the lens face is as virtually at the focal point, and rays of light are projected radially in the focal plane. It will be understood however that the circular filament, when viewed from any point on the inside of the cylindrical lens above or below the focal plane in which the filament lies, will appear as an elliptical form, and two points on the filament figure near the major axis intersection will lie in a position relatively to the focal point, so that when light rays from these points are refracted through the lens they will be emitted in a plane parallel to the focal plane, so that these two points on the filament are, insofar as the performance of a "Fresnel" lens is concerned, virtually at the focal point.

When the flat filament lies in the focal plane, in addition to one point being virtually at the focal point, the straight line projection of the incandescent filament will be refracted and emitted as a straight line lying in the focal plane. The light emitted by the lens to the annular field of illumination in the focal plane and in planes parallel with the focal plane is limited to, first, on the focal plane the projection of straight-line images of the incandescent filament and second, on all other planes parallel to the focal plane the projection of images of two points located approximately at the extremities of the major axis of the oval or elliptical-appearing incandescent filament. The light from the remaining arcs of the incandescent filament is projected systematically above and below the light projected parallel with the focal plane.

When light is projected from a lens parallel with the focal plane, or a cone surface, the light is considered as being in that plane or surface, as for instance in practice in most applications of lenses for illumination purposes, the annular field of illumination is of large radius compared with the diameter and height of the lens, and at one hundred feet from the lens the angular height of the lens will be of the order of one-third of 1°, and for practical purposes within the scope of the present invention the light from the lens itself may be considered as light from a point source when viewed from the field.

Referring now to the accompanying drawings, in Figure 1, L represents the annular lens which is symmetrical about the vertical axis Y—Y and has a focal plane X—X which is formed in the vertical midpoint of a central lens surface 2, and the points A and B represent the cross section of a circular wire filament of the light bulb 3 which lies in the focal plane with its centre coincident with the vertical axis Y—Y.

The line $BP_1$ represents a plane set at an angle of one degree below the focal plane and extending from the point B.

$BP_2$ is a line representing a plane set at an angle of one degree above the focal plane and extending from the point B with a central portion 2' of the lens, the sector 2 is thus in the form of a lens, the focal point of which is the point B.

Circular zones of light rays emanating from the points A and B are indicated by the short and long dotted lines respectively extending from points A and B to points of incidence on the inner face of the lens L at points $D_1$ to $D_8$ above the focal plane XX and $E_1$ to $E_8$ below the focal plane XX.

The rays from these indicated circular zones passing through the upper portion of the lens are refracted so that the rays represented by the long dotted lines RB are substantially parallel to the principal plane $BP_1$ defined, that it is say, they are inclined one degree toward the focal plane XX.

The radial planes represented by the short dotted lines RA are refracted in passing through the upper portion of the lens and these diverge upward from the line RB at an angle consequent upon the angle $AD_1B$.

The rays from the point source at B in passing through the lower portion of the lens are directed parallel to the principal plane $BP_2$ and are inclined one degree toward the focal plane XX and then the rays from the point source A represented by the short dotted lines are divergent downward from the line SB.

It will be understood that the rays from other points of incidence as shown on the lens have the rays from the point source B parallel to the respective principal plane and the rays from the point source A are divergent away from the rays from B.

The curvatures of the outer faces of the central zone 2 of the lens L and the annular lens elements 3', which are of annular form and shown in cross section, are formed so that the rays from B are convergent one degree toward the focal plane, and rays from A are divergent outward from the rays from B.

At points $G_1$ and $G_2$ on the lens face of the central zone 2 the angular divergence between rays coming from A and B is approximately two degrees, so that rays from A are approximately parallel with the rays from B on the opposite side of the focal plane. The centre of curvature for the uppermost portion of the face of the central zone of the lens is in the vicinity of the point $K_1$ on the line $BP_1$, and the centre of curvature for the lowermost portion of the central zone is in the vicinity of the point $K_2$ on the line $BP_2$. The radii to $G_1$ and $G_2$ cross at the point $K_3$ on the focal plane, and the curvature of the face of the central zone of the lens between $G_1$ and $G_2$ is made with a centre at $K_3$, so that distribution of all rays from the filament through the lens in the zone $G_1G_2$ is approximately symmetrical with the focal plane.

Figure 2:
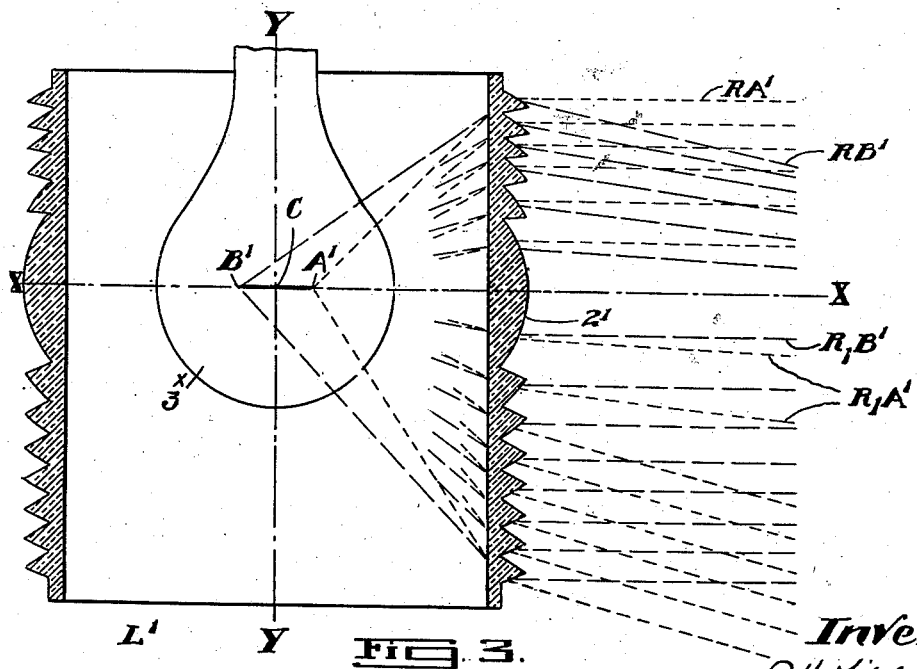
Figure 2 is an arrangement of diagrams illustrating various diversions of light rays from a ring type light source both above and below the focal plane of the lens of Figure 1.

In the diagram shown in Figure 2 filament images are shown as obtainable from points of incidence of light from the incandescent filament AB at specified points on the inner face of the lens shown in Figure 1. In each of these diagrams the line XX shows the location of the plane parallel with the focal plane and the point B as the image of point B of the incandescent filament, which in the four uppermost diagrams is at one degree below the line XX, and in the four lowermost diagrams is at one degree above the line XX. One boundary MM of a 2-degree beam passes through the point B while one degree removed beyond the opposite side of XX is the other boundary of the two-degree beam, and the lines MM and NN are then angularly two degrees apart. All light within the two degrees between the boundaries MM and NN is represented by the length of the arc of the oval within the two boundaries.

On each of the oval diagrams is represented a centre point C which represents the intersection of the vertical axis YY with the focal plane XX in Figure 1. The dotted lines OO and PP represent upper and lower boundaries one degree above and below the point C. These boundaries cut the oval image at each side and include a short arc of filament image at each end of the oval. These two short arcs represent by their total length the amount of light from the incandescent filament in a beam included within one degree of divergence on each side of a plane parallel with the focal plane if the focal point were at C in Figure 1 instead of at B in Figure 1.

The greater length of filament image within the boundaries MM and NN as compared with the sum of the two short lengths of filament image within the boundaries OO and PP indicates an increase of light projected to the annular field within this 2-degree beam from all points lying throughout the circumference of the lens in the particular narrow zone located by any small point aperture on the inner lens face.

The central diagram of Figure 2 is a straight line image as the filament appears at the focal plane.

The oval diagrams at the top and bottom of the illustration in Figure 2 are obtainable from points of incidence on the inside face of the cylinder lens L and are angularly 50 degrees from C above and below the focal plane XX Figure 1 and are from angles beyond the practical limits of a "Fresnel" lens with focus at C due to the critical angle of refraction becoming effective with consequent dispersion of a large amount of light by internal reflection.

However, when B is used as the focal point and with planes parallel to the principal planes BP₁ and BP₂ in Figure 1 as respectively the lower and upper boundary planes for rays from B, it is feasible and practical to continue refracting zones beyond the limits of the basic type of "Fresnel" lenses.

The concentration of light by the lens into a two-degree beam, symmetrical above and below the focal plane is illustrated herein by directing the light refracted from the upper and lower halves of the lens to have intensified boundaries angularly one degree below and above the focal plane. A beam of two degrees divergence is abitrarily chosen; lenses for beams of greater or less angular divergence may be designed by selecting the angularity of the principal planes with respect to the focal plane.

It will be noted that the light emitted outside the two-degree beam is directed at angles greater than would be the case if the centre point C were the focal point and the principal plane were the focal plane. The total angular divergence of upper and lower boundary rays in the oval diagrams in Figure 2 is disposed with the point B having one degree of angularity above or below planes parallel with the focal plane, and the remaining degrees of angularity disposed below or above respectively, while if the point C in Figure 1 were the focal point and the principal plane were the focal plane the divergent beam is practically centered on planes parallel with the focal plane. For example, in typical complete beams if filament images both above and below the focal plane have angular lengths of minor axis equal to 10°, then in the present lens 9° will be angularly on each side of the focal plane, or there will be a total divergence of 18°, while the filament images from a basic type of "Fresnel" lens with focus at C the total divergence will be 10°. This increased divergence is of considerable practical value. In the lens illustrated in Figure 8 the same general results are obtained as with the lens of Figure 1 but in the lens of Figure 8 A is used instead of B as the common focus for the lense elements.

The lens of Figure 1 with B as common focus is actually preferable because the lens is capable of receiving a larger quantity of effective light from the source as the limiting critical angle of incidence, when B is focus, permits of greater overall height of the complete lens.

In the form of lens illustrated in Fig. 3, the annular lens L' is symmetrical about the vertical axis YY but is not symmetrical above and below the focal plane XX.

The circular filament A'B' of the incandescent lamp 3ˣ lies in the focal plane. Above the focal plane the lens zones have their common focus at A' and below the focal plane the lens zones have their common focus at B'. Rays from A' to the lens above the focal plane are emitted in planes parellel with the focal plane, as represented by the short dotted lines RA', then rays from B' are divergent below rays from A', such as the rays RB'. Rays from B' to the lens below the focal plane are emitted in planes parallel with the focal plane, such the rays R₁B'. Then rays from A' are divergent below the rays from B', such as rays R₁A'. The curvature of the portion of the central zone 2' of the lens above the focal plane has a shorter radius than that of the portion below the focal plane but both curves meet at the focal plane and have a common tangent normal to the focal plane.

Figure 7:
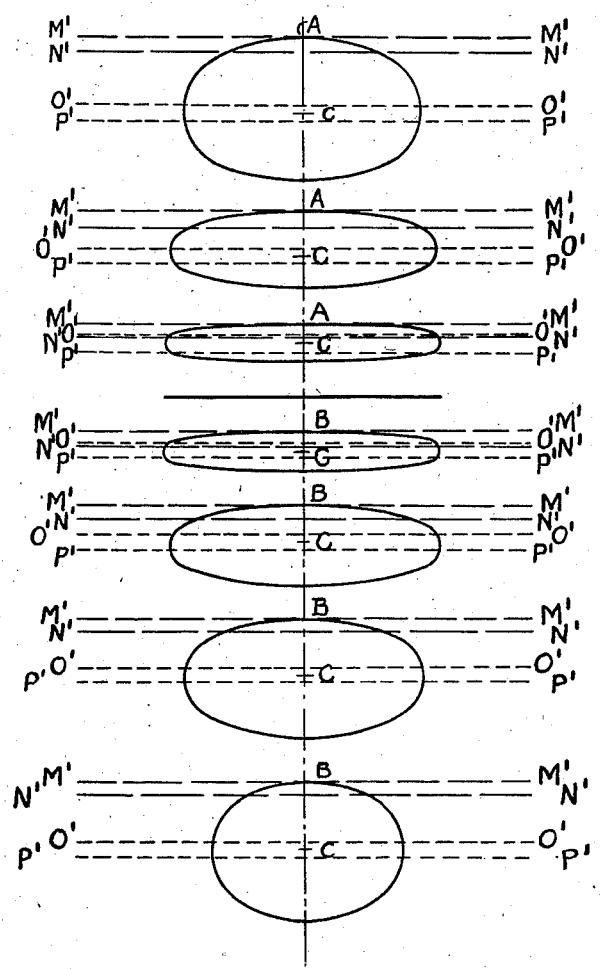
Figure 7 is an arrangement of diagrams similar to those shown in Figure 2 relative to the lens of Figure 3.

In the diagram shown in Figure 7 filament images are shown as obtained from points of incidence of light from the filament A'B' at specific points on the inner face of the lens of Figure 3. The three upper diagrams are taken from points 10°, 20° and 35° angularly upward from the point C of intersection of the main focal plane XX and the vertical axis YY and indicate images of the point A' on the lines M'M' which are tangent to the upper arcs of the ovals and parallel to the focal plane.

In the four lower diagrams the lines M'M' include the images of the point B and are tangent to the upper arcs of the ovals and parallel to the focal plane. The major and minor axes of the ovals indicate the angular horizontal and vertical divergence of the individual rays resulting in the filament images. The lines N'N' parallel with lines M'M' are shown as angularly one degree below the lines M'M'. The point C in each oval diagram is shown in its position relative to that shown in Figure 3.

Two lines O'O' and P'P' are shown each one half degree above and below the point C. The length of the arc of the filament image within the boundaries M'M' and N'N' as compared with the sum of the arcs between the lines O'O' and P'P' indicates the relative intensities of the beam at and within one degree below the planes parallel with the focal plane of the present lens as compared with a lens having its focus at point C.

The integration of the relative intensities within one degree of divergence throughout the vertical zones and throughout the annular lens show a intensity of about four times that obtainable from a basic "Fresnel" lens focused at C using the same flat circular incandescent filament.

The resulting distribution outward from the lens throughout its whole circumference is at and below planes parallel with the focal plane and in practical use may be considered as at and below the focal plane. The complete beam is of high intensity at and immediately below the focal plane and as the rays become more divergent downward the light intensity decreases and no rays are directed angularly above the focal plane.

In the adaptation of this invention as illustrated in Figure 4, only the portion of the lens illustrated in Figure 3 below the focal plane XX is shown, and an annular reflector R is arranged above the focal plane which effects redirection of rays incident from the incandescent filament AB of the lamp back through the filament to be incident on the lens in directions as if direct from the source at AB, and the light rays actually passing downward from the source and incident on the lens are augmented by the light rays from the reflector with coincident paths after refraction by the lens. The sectional shape of the reflector is preferably elliptical with foci at A and B, or, it may if desired be spherical with the centre at C.

In the form of the device illustrated in Figure 5 the lens includes the lower portion and the central zone extending above and below the focal plane XX. An annular ellipsoidal or spherical reflector R' is arranged above the lamp so that the rays from A incident on the reflector are re-directed through or adjacent B to impinge on the most outward zone of the lens.

In the form illustrated in Figure 6 an annular lens is shown in cross section which is symmetrical about the axis YY and the circular filament of the lamp is arranged in the focal plane XX.

The lens which may be shaped into a bowl-shaped enclosure Z, as indicated by dotted lines, is provided with a reflector $R^X$ shown in dotted lines. A line $K'.B.K^2$ extending through the focal point B is angularly arranged 15° below the focal line XX to trace the surface of a cone. The outer curved face of the lens section is circular with the centre at K' on the line $BK_2$. The inner face of the lens section is circular with centre in the vicinity of $K_2$ so that light rays from point B on the incandescent filament incident to the inner lens face DE are deflected by the lens to be redirected from the outer lens face parallel with the line $K_1BK_2$. Then all rays from the point A on the incandescent filament incident on the inner lens face DE at the intersection with XX are refracted to be coincident with rays from B and all other rays from A are refracted to be directed angularly below the rays from B, while all intermediate rays from the oval appearing filament are directed angularly between the rays from B and A.

A lens such as herein described and shown in Figure 6 is particularly applicable as an element for street lighting devices to provide high intensity light distribution at 75° to the vertical axis. While the lens surfaces are preferably double convex as shown, they may be plano-convex similar to the central zone of the lens illustrated in Figure 3, with the internal face normal to the line $K_1BK_2$.

In the use of conventional "Fresnel" lenses with light sources of practical dimensions, such as flames, gas mantles or concentrated filament incandescent lamps, angular variations in ray paths within each zone due to spherical aberration are of small consequence.

The zones of lenses constructed as herein described require that spherical aberrations be corrected to a degree consistent with the application and with the limitations and tolerances of materials and construction of the various parts of the device of which the lens is a part. Compromises in the location of the centres for scribing the convex curvatures will, in general, provide a sufficient degree of refinement. For example, if a zone adjacent the axis is laid out to refract incident light rays from a point source on the lamp filament up to 15° from the axis to be parallel with the focal plane, the axial centre of circular curvature may be made correct for incident rays at 12° to the axis, and as rays are also correct at the axis, deviation of emitted rays due to spherical aberration, at any other angle of incident light up to 15°, is minimized.

It will of course be understood that the conventional ring type filament incandescent lamp does not present a complete circle. The filament is suspended on a plurality of supports, two of which are conductors, and there is no filament in the short arc between the two conducting supports. This will of course effect the complete circle of light and the gap in the filaments can be oriented so as to bring the deficient area into the most desirable position.

It will be understood that with lenses such as herein described the light from the filament source will be distributed most advantageously in a plane or planes extending laterally from the light fixture, and the maximum amount of light rays emanating from the source will be directed into desirable zones of concentrated light and within limits lenses are adaptable to the angular shifting of the zones of concentration. While the lenses are shown with the lamp filament lying in the focal plane of the lens it will be understood that such filament may be raised or lowered to effect a lowering or raising of the emitted light beam within a few degrees range, and if a reflector is used the reflector is moved with the lamp.

Light distributing lenses such as herein described will very greatly enhance the lighting value of the standard ring type of filament electric lamp, thereby rendering an increased concentration of light in the use of such lamps.

Further, these lenses obtain desirable new distributions and concentrations of light unobtainable with any other light source of practical dimensions.

What we claim as our invention is:

1. A light refracting member having a focal plane in right angular relation to the axis thereof and axially spaced annular light refracting lens elements arranged parallel with said focal plane, the section of said lens elements in planes parallel with and intersecting the axis of said member having its focus at a point on a circle centered on the lens axis and lying in the focal plane, said focal point being in a vertical plane intersecting the vertical axis and the point of incidence of a light ray on the lens, said lens element section being formed to refract and project the incident ray from said focal point in a definite angular relation to said focal plane, and a flat filament light source forming the circle centered on the axis of the refracting member.

2. The combination with a flat annular light source, of a substantially cylindrical lens having its axis extending right angularly through the centre of said annular source, said lens having an annular portion forming a light converging lens with a central focal plane and annular lens portions spaced axially from the focal plane and focussed to refract rays emanating from points on the side of the light source diametrically remote from the point of incidence and in line with the axis to extend outward in line with the axis in parallel planes converging toward the said focal plane and to refract rays emanating from points on the side of the light source adjacent to the lens and in line with the axis to extend outward in radial planes diverging from the said converging rays angularly to an extent consequent upon the respective angle between the rays from the two points in the said adjacent and remote sides of the source where they are together incident on the lens portion and rays from other points on the flat annular light source laterally spaced from the axis being refracted to extend in directions laterally and between the rays from the two said points.

3. The combination with a flat annular light source, of a substantially cylindrical lens having its axis extending right angularly through the centre of said annular source, said lens having an annular portion forming a light converging lens with a central focal plane and annular lens portions spaced axially from the focal plane and focussed to refract rays emanating from points on the side of the light source adjacent the lens in line with the axis to extend outward in line with said axis in parallel planes converging toward the said focal plane, and to refract rays emanating from points on the diametrically remote side of the light source in line with the axis to extend outward in radial planes diverging from the said converging rays angularly to an extent consequent upon the respective angle between the rays from the two points in the said adjacent and remote sides of the source where they are together incident on the lens portion and rays from other points on the flat annular light source laterally spaced from the axis being refracted to extend in directions laterally and between the rays from the two said points.

4. The combination with a flat annular light source, of a substantially cylindrical lens having its axis extending right angularly through the centre of said annular source, said lens having an annular portion forming a light converging lens with a central focal plane and annular lens portions spaced axially from the focal plane and focussed to refract rays emanating from points on the diametrically remote side of the light source in line with the axis to extend outward in line with the axis in planes parallel with said focal plane and to refract rays emanating from points on the side of the light source adjacent the lens in line with the axis to extend outward in radial planes diverging from the said parallel rays angularly to an extent consequent upon the respective angle between the rays from the two points in the said adjacent and remote sides of the source where they are together incident on the lens portion and rays from other points on the flat annular light source laterally spaced from the axis being refracted to extend in directions laterally and between the rays from the two said points.

5. The combination with a flat annular light source, of a substantially cylindrical lens having its axis extending right angularly through the centre of said annular source, said lens having an annular portion forming a light converging lens with a central focal plane and annular lens portions spaced axially from the focal plane and focussed to refract rays emanating from points on the side of the light source adjacent the lens in line with the axis to extend outward in line with the axis in planes parallel with the said focal plane and to refract rays emanating from the points on the diametrically remote side of the light source in line with the axis to extend outward in radial planes diverging from the said parallel rays but converging toward the focal plane angularly to an extent consequent upon the respective angle between the rays from the two points in the said adjacent and remote sides of the source where they are together incident on the lens portion and rays from other points on the flat annular light source laterally spaced from the axis being refracted to extend in directions laterally and between the rays from the two said points.

6. A lens developed in a plane through its axis and by rotation about the axis describing an annular refracting member, the axis lying in the plane of development having a focal plane at right angles and an incandescent flat circular light source coincident with the focal plane and centered on the axis and the plane of development cutting the circular light source in two points on opposite sides of the axis each point being equidistant from the axis, the inner face of the lens system being a continuous line and the outer face of the lens system being composed of curvatures forming lens elements, the lens elements respectively having their focus at one of the two points on the circular filament in the plane of development and each lens portion having such inner and outer cross-sectional boundary profiles in the plane of development which will refract and project incident rays from the source at the focus to be directed radially in planes having definite angular relation to the focal plane.

PERCIVAL H. MITCHELL.
SCOTT MALCOLM.

REFERENCES CITED

The following references are of record in the file of this patent:

UNITED STATES PATENTS

| Number | Name | Date |
|---|---|---|
| 801,766 | Churchill | Oct. 10, 1905 |
| 974,123 | Churchill | Nov. 1, 1910 |
| 1,307,579 | Churchill et al. | June 24, 1919 |
| 1,514,413 | Adams | Nov. 4, 1924 |
| 1,986,065 | Maillet | Jan. 1, 1935 |
| 2,133,377 | Cullman | Oct. 18, 1938 |
| 2,133,378 | Cullman | Oct. 18, 1938 |
| 2,344,295 | Franck | Mar. 14, 1944 |

FOREIGN PATENTS

| Number | Country | Date |
|---|---|---|
| 453,983 | Great Britain | 1936 |
| 581,751 | France | Oct. 2, 1924 |